Dec. 2, 1941.  C. S. ASH  2,264,785

DUAL WHEELED VEHICLE

Filed April 29, 1939  2 Sheets-Sheet 1

INVENTOR
C. S. Ash.
BY Morgan Finnegan
& Durham
ATTORNEYS

Dec. 2, 1941.  C. S. ASH  2,264,785
DUAL WHEELED VEHICLE
Filed April 29, 1939   2 Sheets-Sheet 2

C. S. Ash INVENTOR
BY
Morgan Finnegan & Durham
ATTORNEY

Patented Dec. 2, 1941

2,264,785

UNITED STATES PATENT OFFICE 2,264,785

DUAL WHEELED VEHICLE

Charles S. Ash, Milford, Mich.

Application April 29, 1939, Serial No. 270,757

10 Claims. (Cl. 180—22)

The invention relates to new and useful improvements in dual wheel assemblies for vehicles, and more especially to such improvements in dual, driven, differential, dirigible wheel assemblies especially adapted for service in heavy motor vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figures 1, 2:
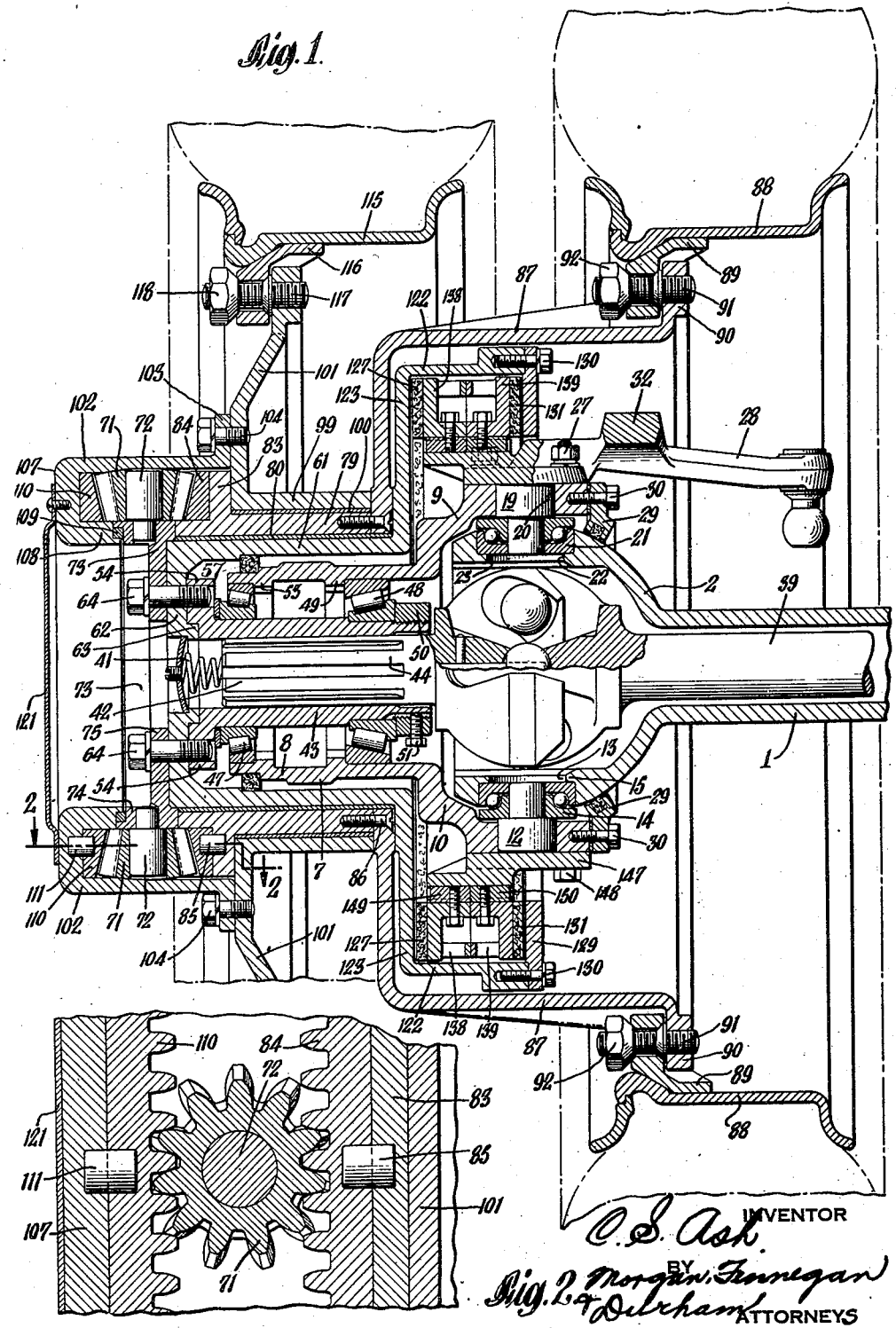
Fig. 1 is a fragmentary, vertical, central, transverse section through a wheel assembly embodying the invention.
Fig. 2 is an enlarged detail section on line 2—2 of Fig. 1.
Figure 3:
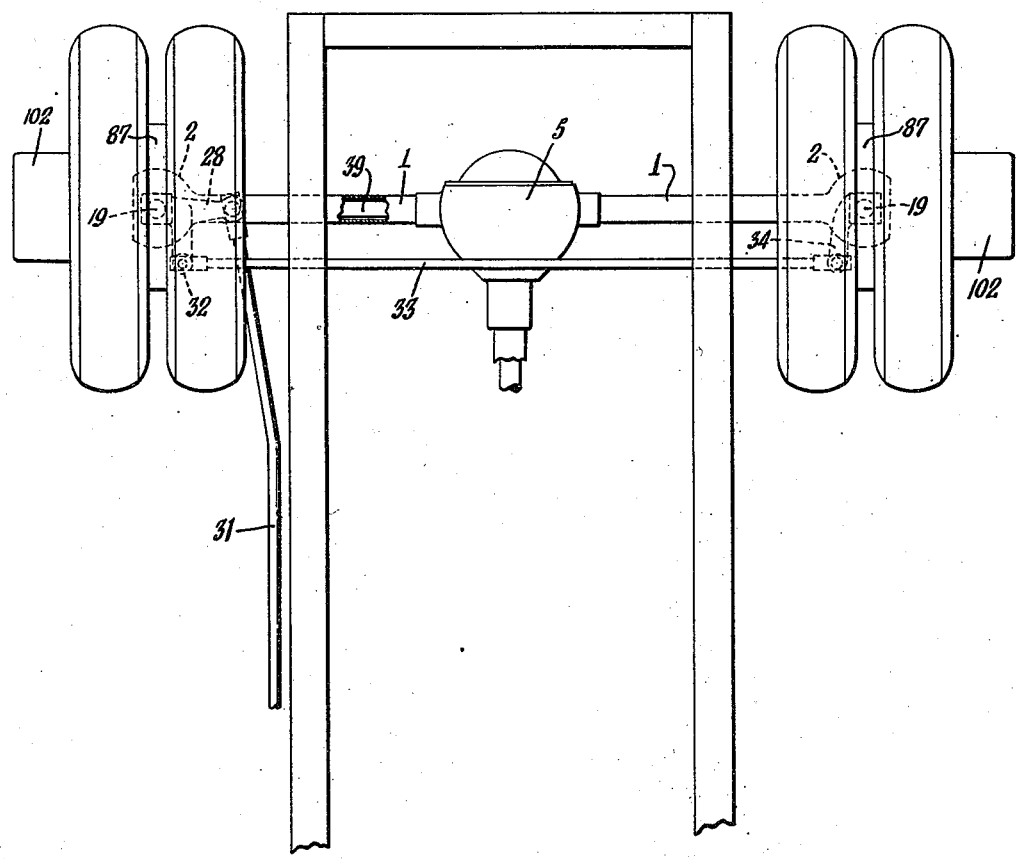
Fig. 3 is a plan of a front axle assembly embodying the invention.

Objects of the invention are to provide powerful and equalized driven dual wheel equipment for motor trucks and other heavy-duty vehicles, and more especially to provide such wheel equipment for use at the front end of such vehicles, said equipment being capacitated to effect the steering in addition to the other enumerated functions; to provide at the front end of heavy-duty motor vehicles dual, driven, differential, dirigible wheel equipment; to provide therewith braking means exerting uniform and equalized braking action on all the wheels; to provide dual, dirigible front wheels at either end of the front axle beam, both wheels of each pair being positively driven, and at the same time permitting differential movement between the driven wheels of each pair to compensate for differences of path between the inboard and outboard wheels of the pair, or for other causes of variation in peripheral travel or velocity; to provide for concurrent, equalized braking action upon the wheels of a pair, while freely permitting necessary differential movement of the wheels; to provide dual wheel equipment at each end of the front axle having the above-described properties, and providing uniform steering control and also permitting full differential movement of all said wheels concurrently with a positive drive of all four wheels.

To these ends a front end dual wheel assembly is provided having a front axle-beam housing with a centrally-located driven differential enclosed, and at either end of the axle housing there is connected thereto by a usual yoke and knuckle and king pin joint a hollow spindle, upon which a pair of dual wheels is journaled, by means of nested hubs, the spindles being movable about the king pins by the steering mechanism in the usual manner. Within said front axle-beam housing are two live shafts, driven from the central differential, each shaft carrying at its outer end a live stub shaft connected thereto by a universal joint. The drive from the live stub shafts to their respective dual wheels comprises a differential gear wherein a planet gear and an arm on which it is mounted are rotatively driven by the stub shaft, the planet gear meshing with two gear rings fixed to the two wheels, respectively. The planet gear is rotated with the driven stub-shaft and normally both wheels are rotated with the planet gear, but owing to the differential, the wheels each have added rotational movement with respect to the planet gear without disturbing or impairing the positive drive of the wheels from the driven stub shaft. Equalized brake pressure may be applied to the planet gear to retard both wheels. It will be understood that the foregoing general description and the following detail description as well are exemplary and explanatory of the invention but are not restrictive thereof.

Referring now in detail to the embodiment of the invention illustrated by way of example in the accompanying drawings, a front axle beam is provided comprising a housing 1 formed to include at its central portion a differential drive 5 and having at each end a hollow, spherical knuckle 2. Mounted on the knuckle 2 by means of king-pin joint is a non-rotatable spindle 7 having a hollow, cylindrical horizontally-extending body 8 and integral therewith two arms 9 and 10, which may be connected together by spherical side webs, and which extend inwardly and embrace the top and bottom portions of the hollow spherical knuckle 2 of the axle-beam housing 1. The king-pin connection between the spindle yoke and the housing, on the bottom side, comprises a shouldered pin 12, mounted and supported in the lower yoke-arm 11 and projecting upwardly therefrom into an opening 13 in the lower part of the spherical knuckle 2. Between the yoke-arm 10 and the knuckle 2 is an anti-friction thrust bearing 14, and one race thereof is supported on the top of the enlarged head of the pin 12, and an annular flange 15 formed in the upper part of the aperture 13 of the knuckle 2 rests upon and is supported by the other raceway of the bearing. On the upper side of the king-pin connection is a similar but reversed construction, wherein a pin 19 with an enlarged head is set in an aperture 20 in the yoke arm 9, and the lower face of the head of pin 19 rests on the top ring of an anti-friction thrust bearing 21, which in turn is supported by its lower ring resting on an annular, inwardly-extending projection 22, formed in the opening 23 in the top of the knuckle. Fixed to the yoke-arm 9 by screw-bolts 27 is an arm 28, to which is connected a rod 31, which is connected to the steering mechanism in any known and suitable manner, and arms 32 and 34, fixed to the spindle knuckles, and connected together by a rod 35, all in a known manner, to turn the front wheels to effect the steering of the vehicle. A lubricant seal in the form of a spheroidal ring 29 is fixed on the inner side of the yoke construction, and is held in place by bolts 30.

The embodied form of means for driving all four of the front wheels, as here exemplarily embodied comprises at either side a live shaft 39, driven from the differential which is mounted in the axle housing 1, such a shaft extending from the differential to the dual wheels at either end of the axle shaft. Connected to the live shaft 39 by any suitable universal joint, shown here conventionally as a Marmon-Herrington joint, is a live stub shaft 42. Surrounding this live stub shaft is a hollow driven sleeve 43, the shaft and sleeve being rotatably connected together, but so as to have considerable play between them, in the axial direction, and for this purpose, the periphery of the shaft is formed into a broad face pinion 44 with which mesh inwardly-projecting teeth formed on the interior of the sleeve 43. A coil spring 41 acts resiliently against the end of the stub shaft. The live stub shaft 42 and its connected rotatable sleeve 43 are enclosed within the hollow spindle 7 and are rotatively mounted therewithin by means of radial thrust roller bearings 47 and 48 interposed between the exterior of the sleeve 43 and the interior of the hollow spindle 7. The inner bearing 48 is held axially in position between an inwardly-extending annular projection 49 on the interior of the sleeve 7 and a retaining ring 50 screw-threaded onto the inner end of the sleeve 43 and held against rotation by a clamping screw 51. The outer bearing is held axially in position between an inwardly-extending annular projection 53 on the interior of the sleeve 7 and an outwardly-projecting annular flange 54 formed on the exterior end of the sleeve 43.

The dual wheel structure and the connections thereto from the driving means to effect the required differential drive, in accordance with one feature of the invention, and as here embodied, are mechanically combined with braking means for exerting equalized retardation on the dual wheels through the differential gearing. As embodied, a hub-like cylinder 61 encloses the hollow spindle 7, and is connected to the live sleeve 43 to rotate therewith and a retaining washer 57 is preferably interposed. The braking mechanism is connected to the cylindrical member 61, as hereinafter described. The hub-like cylinder 61, at its outer end, has an integral, inwardly-projecting annular flange 62, which terminates about a central aperture in an inwardly and axially-projecting annular shoulder 63. The inner flat face of flange 62 and the inwardly-projecting annulus 63 fit into correspondingly-formed shouldered surfaces in the outer face of the outwardly-projecting annular flange 54 which is integral with the live sleeve 43, and these parts are held together by screw bolts 64.

The differential gear drive comprises a plurality of bevel pinions 71, rotatively mounted on stub shafts 72 which are fixed to and project outwardly radially from an angled ring 73, which ring comprises a peripheral flange portion 74 and integral therewith on its inner side, an inwardly-projecting, flat annular flange 75. The flange 75 abuts against the flat outer face of the annular flange 62 of the hub 61 and the inner edge portion of the peripheral ring 74 fits over the outside of the hub 61, and this structure is fixed to the live sleeve 43 and live hub 61 by means of the screw bolts 64. The planet gear 71 is thus rotatable upon an axis or arm which rotates with stub shaft 42 and sleeve 43.

The dual wheels have nested broad hubs journaled on the hub-like cylinder 61, and are gear connected to the opposite sides of the planet gears 71 of the differential drive. As here embodied, the inboard wheel has a hub 79 mounted on the cylinder 61 with an interposed anti-friction bushing 80. The hub 79 at its outer end abuts on the inner face of the ring 74, with or without an interposed thrust bearing, and integral with the hub 79 is an outwardly-extending annular flange 83, located a short distance inwardly from the outer face of the hub, to provide a seat for a bevel gear ring 84, which is fixed to flange 83 by a series of angularly spaced-apart pins 85, the gear ring 84 being in mesh with the planet pinions 71 on one side thereof. Fastened to the hub 79 on its opposite inner face, by suitable means such as screws 86, is the web 87 of the inboard wheel, which web is preferably deeply dished to enclose a braking mechanism, as later described, and also to enclose the king-pin mounting, the projected axis of which, preferably, would intercept the road surface between the treads of the dual wheels. A suitable rim 88 is mounted upon the wheel body 87 and is held thereto by suitable means, such as attaching lugs 89, which are firmly fastened by screw bolts 91 screw-threaded into the outwardly-extending inner rim 90 of the wheel body 87. Lugs 89 are held in place on the bolts 91 by nuts 92.

The hub 99 of the outboard wheel is journaled on the hub 79 of the inboard wheel with an interposed anti-friction bushing 100. Integral with the hub 99 is the web 101 of the outboard wheel. The embodied gear drive connection for this wheel comprises a cylindrical housing 102 which serves the further purpose of enclosing the differential gear drive. The housing 102 has at its inner end an annular, outwardly-extending flange 103 which abuts on the outer flat face of the wheel web 101, and they are fastened together by screw bolts 104. On its outer end the cylindrical portion 102 has an integral inwardly-projecting part 107 which terminates in an integral axially and inwardly-projecting annular flange 108, the inner rim of which abuts against the outer side of the ring 73 on which the planet gears 71 are rotatably mounted. A sealing ring 109 is preferably interposed. Set into the annular recessed interior formed by the cylinder 102, and its integral parts 107, 108 is a bevel gear ring 110, held angularly in position by pins 111 extending thereinto and into the part 107, this ring meshing with the planetary pinions 71 on their opposite sides, thus providing the differential drive to both wheels from the live shaft 39. A rim 115 for the outboard wheel is mounted thereon and held in place in known or other suitable manner by means of lugs 116, which are apertured to receive the bolts 117 which are screw threaded into the outer part of the wheel web, the lugs being held on the bolts by nuts 118. A plate 121 acts as a closure for the outer end of the structure.

The means for effecting equalized braking upon the dual wheels, in accordance with one feature of the invention acts preferably through the differential gear, and as here embodied, comprises an outwardly-extending annular web 123, integral with and extending outwardly from the inner end of the hub-like member 61, and having integral therewith a cylindrical, inwardly-extending drum-like portion 122, the brake mechanism being mounted on and enclosed within the aforesaid structure. The brake structure is preferably of the general form shown and claimed in my copending application, Ser. No. 263,347, filed March 22, 1939. As here exemplarily shown, mounted on the yoke-like portion 9, 10 of the spindle are two side-by-side, annular, channeled brake shoes 138 and 139 and fixed to the flat annular outside faces thereof are frictional flat annular members 127 and 131, respectively, which are the actual friction-exerting surfaces. When the two brake shoes are concurrently moved apart axially to effect the braking action, the member 127 of brake shoe 138 frictionally engages the inner flat face of the part 123 of the brake drum, and the friction-exerting member 131 of brake shoe 139 engages the inner face of a flat inwardly-projecting annular plate 129, abutting on and fixed to the flat annular inner end of the part 122 of the brake drum being fastened thereto by screw bolts 130. The axially-movable annular brake shoes 138 and 139 are held against angular movement by means of peripheral recessed seats formed in the outer periphery of a cylindrical member 147, fitting about the yoke structure 9, 10 and fixed thereto by screw bolts 148. Blocks 149 and 150 are fixed to the two brake shoes, respectively, and are seated in the recesses and are axially slidable to permit the braking action but prevent angular displacement. The means for moving the brake shoes to and fro axially to put on and let off the braking pressure may be of any suitable or desired form, and mechanisms such as are shown in my copending applications, are preferably utilized, wherein the brake shoes are held off by springs, and are applied by hydraulic or other fluid pressure.

The invention in its broader aspects is not limited to the specific mechanisms shown and described but departures may be made therefrom within the scope of the accompanying claims without departing from the principles of the invention and without sacrificing its chief advantages.

What I claim is:

1. A dual wheel assembly including in combination a front axle housing, a differential drive within said housing, live axles within said housing driven by the differential, hollow spindles connected to the ends of said axle housing to turn on substantially vertical axes, stub shafts within said hollow spindles, each connected to the outer end of a live axle by a universal joint, dual wheels having their hubs nested and journaled on each of said hollow spindles, a differential drive between each of said stub shafts and its dual wheels comprising a sleeve within said hollow spindle and enclosing a stub shaft and connected to rotate therewith while permitting relative axial movement, a planet gear rotatably mounted to have angular rotation with said sleeve and stub shaft, a gear ring fixed to one of the dual wheels and meshing with the planet gear, and a gear ring fixed to the other of the dual wheels and meshing with the planet gear.

2. A dual wheel assembly including in combination a front axle housing, a differential drive within said housing, live axles within said housing driven by the differential, hollow spindles connected to the ends of said axle housing to turn on substantially vertical axes, stub shafts within said hollow spindles, each connected to the outer end of a live axle by a universal joint, dual wheels having their hubs nested and journaled on each of said hollow spindles, a differential drive between each of said stub shafts and its dual wheels comprising a sleeve within said hollow spindle and enclosing a stub shaft and connected to rotate therewith while permitting relative axial movement, a planet gear rotatably mounted to have angular rotation with said sleeve and stub shaft, a gear ring fixed to one of the dual wheels and meshing with the planet gear, and a gear ring fixed to the other of the dual wheels and meshing with the planet gear.

3. A dual wheel assembly including in combination a front axle housing, a differential drive within said housing, live axles within said housing driven by the differential, hollow spindles connected to the ends of said axle housing to turn on substantially vertical axes, stub shafts within said hollow spindles, each connected to the outer end of a live axle by a universal joint, dual wheels having their hubs nested and journaled on each of said hollow spindles, a differential drive between each of said stub shafts and its dual wheels comprising a sleeve within said hollow spindle and enclosing a stub shaft and connected to rotate therewith while permitting relative axial movement, a planet gear rotatably mounted to have angular rotation with said sleeve and stub shaft, a gear ring fixed to one of the dual wheels and meshing with the planet gear, and a gear ring fixed to the other of the dual wheels and meshing with the planet gear.

4. A dual wheel assembly including in combination a front axle housing, a differential drive within said housing, live axles within said housing driven by the differential, hollow spindles connected to the ends of said axle housing to turn on substantially vertical axes, stub shafts within said hollow spindles, each connected to the outer end of a live axle by a universal joint, dual wheels having their hubs nested and journaled on each of said hollow spindles, a differential drive between each of said stub shafts and its dual wheels comprising a sleeve within said hollow spindle and enclosing a stub shaft and connected to rotate therewith while permitting relative axial movement, a planet gear rotatably mounted to have angular rotation with said sleeve and stub shaft, a gear ring fixed to one of the dual wheels and meshing with the planet gear, and a gear ring fixed to the other of the dual wheels and meshing with the planet gear.

5. A dual wheel assembly including in combination a front axle housing, a differential drive within said housing, live axles within said housing driven by the differential, hollow spindles connected to the ends of said axle housing to turn on substantially vertical axes, stub shafts within said hollow spindles, each connected to the outer end of a live axle by a universal joint, dual wheels having their hubs nested and journaled on each of said hollow spindles, a differential drive between each of said stub shafts and its dual wheels comprising a sleeve within said hollow spindle and enclosing a stub shaft and connected to rotate therewith while permitting relative axial movement, a bearing between said spindle and sleeve, a planet gear rotatably mounted to have angular rotation with said sleeve and stub shaft, a gear ring fixed to one of the dual wheels and meshing with the planet gear, and a gear ring fixed to the other of the dual wheels and meshing with the planet gear.

6. A dual wheel assembly including in combination a front axle housing, a differential drive within said housing, live axles within said housing driven by the differential, hollow spindles connected to the ends of said axle housing to turn on substantially vertical axes, stub shafts within said hollow spindles, each connected to the outer end of a live axle by a universal joint, dual wheels having their hubs nested and journaled on each of said hollow spindles, a differential drive between each of said stub shafts and its dual wheels comprising a sleeve within said hollow spindle and enclosing a stub shaft and connected to rotate therewith while permitting relative axial movement, a bearing between said spindle and sleeve, a planet gear rotatably mounted to have angular rotation with said sleeve and stub shaft, a gear ring fixed to one of the dual wheels and meshing with the planet gear, and a gear ring fixed to the other of the dual wheels and meshing with the planet gear.

7. A dirigible dual wheel assembly including in combination a pair of relatively rotatable dual wheels, a spindle mounted for steering movement on a king pin and about which the dual wheels are coaxially mounted for rotation, a driving shaft coaxial with the spindle, and differential gearing at the outer side of the dual wheels interconnecting the shaft and the wheels for driving both wheels from the shaft, said king pin being located substantially between the wheels.

8. A dirigible dual wheel assembly including in combination a pair of relatively rotatable wheels, having telescoping hubs, a spindle about which the wheels are rotatably mounted and mounted for steering movement about a king pin, a driving shaft coaxial with the spindle, a pair of ring gears, one attached to each of the wheel hubs at their outboard ends, and a set of differential pinions carried by the outer end of the driving shaft and meshing with the ring gears.

9. A dirigible dual wheel assembly including in combination a king pin, a spindle pivoted on the king pin, a driving shaft projecting through the spindle, a sleeve projecting inwardly from the outer end of the shaft, a pair of relatively rotatable wheels having telescoping hubs journalled on the sleeve and differential gearing supported by said sleeve and interconnecting the outer end of the shaft and wheel hubs for driving both wheels from the shaft.

10. A dirigible dual wheel assembly including in combination a king pin, a spindle pivoted on the king pin, a driving shaft projecting through the spindle, a sleeve projecting inwardly from the outer end of the shaft, a pair of relatively rotatable wheels having telescoping hubs journalled on the sleeve and differential gearing supported by said sleeve and interconnecting the outer end of the shaft and wheel hubs for driving both wheels from the shaft, and a brake drum carried by the inner end of the sleeve and surrounding the king pin.

CHARLES S. ASH.